United States Patent [19]

Hillenbrand et al.

[11] Patent Number: 5,349,916
[45] Date of Patent: Sep. 27, 1994

[54] SYSTEM FOR EFFECTING UNDERWATER COUPLING OF OPTICAL FIBER CABLES CHARACTERIZED BY A NOVEL POD-TO-VEHICLE INTERLOCK

[75] Inventors: Christopher F. Hillenbrand, Bristol; Thomas D. Barron, Portsmouth; David M. Nugent, Newport, all of R.I.

[73] Assignee: The United States of America as represented by the Secretary of the Navy, Washington, D.C.

[21] Appl. No.: 120,880

[22] Filed: Sep. 13, 1993

[51] Int. Cl.$^5$ .............................................. B63G 8/00
[52] U.S. Cl. .................................................... 114/312
[58] Field of Search ............... 114/221 R, 221 A, 230, 114/312, 322, 153, 51; 244/137.1; 258/1.2; 405/188; 294/66.1, 82.28; 441/27

[56] References Cited

U.S. PATENT DOCUMENTS

| | | | |
|---|---|---|---|
| 2,723,153 | 11/1955 | Ansell | 114/51 X |
| 3,336,005 | 8/1967 | Dickerman | 258/1.2 |
| 3,757,722 | 9/1973 | Seiple | 114/322 |
| 3,987,741 | 10/1976 | Tryon | 114/322 |
| 5,235,932 | 8/1993 | Reich | 405/188 X |

*Primary Examiner*—Sherman Basinger
*Attorney, Agent, or Firm*—Michael J. McGowan; Prithvi C. Lall; Michael F. Oglo

[57] ABSTRACT

A submarine trails one fiber optic cable and an undersea vehicle is controlled by this first cable. A missile/torpedo trails a second cable that is to be coupled to the first cable. The second cable has a segment suspended vertically underwater between a buoyant pod and a sea anchor type buoy. The undersea vehicle, or Autonomous Undersea Vehicle, (AUV) hunts for the pod by a conventional homing transmitter, and a fork-shaped cable capture probe on the vehicle direct the cable's movement relative to the vehicle into a pod mating position in which a male plug portion in the underside of the pod mates with a female socket in a slot formed at the vertex of the fork. An interlock mechanism between the male socket and female socket holds the pod and AUV in engagement wherein optical coupling is achieved.

10 Claims, 5 Drawing Sheets

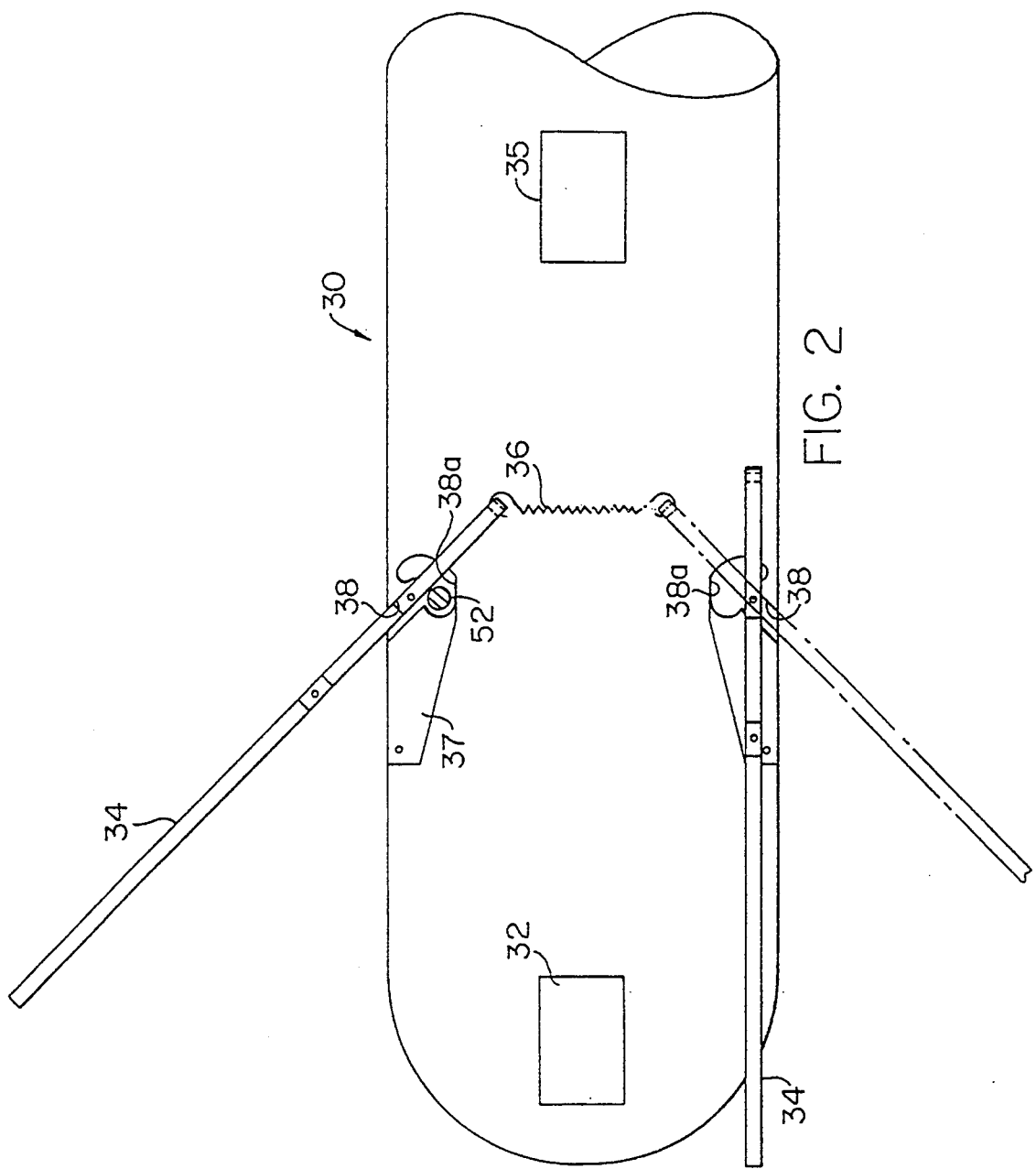

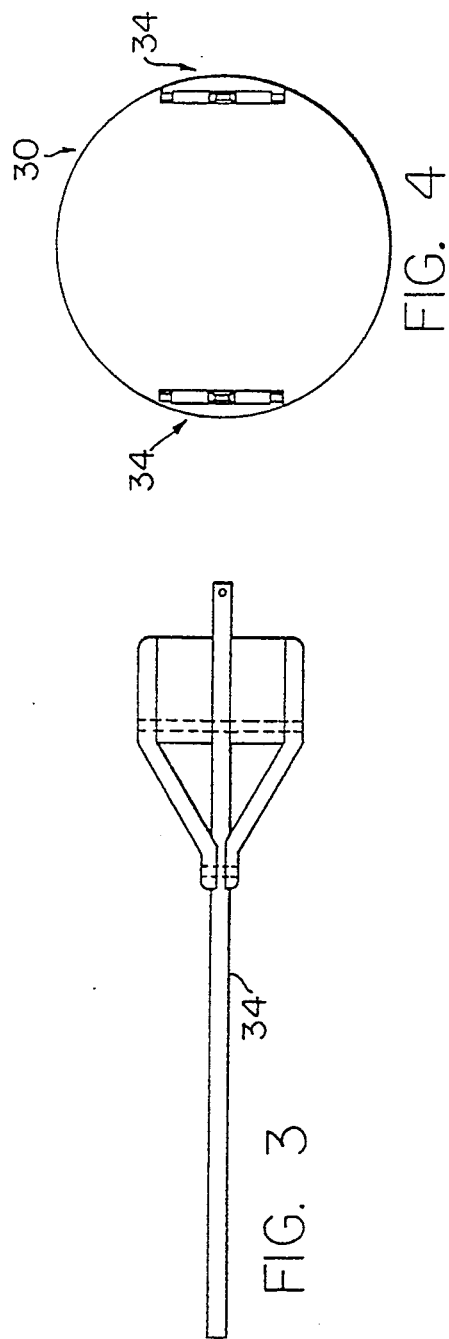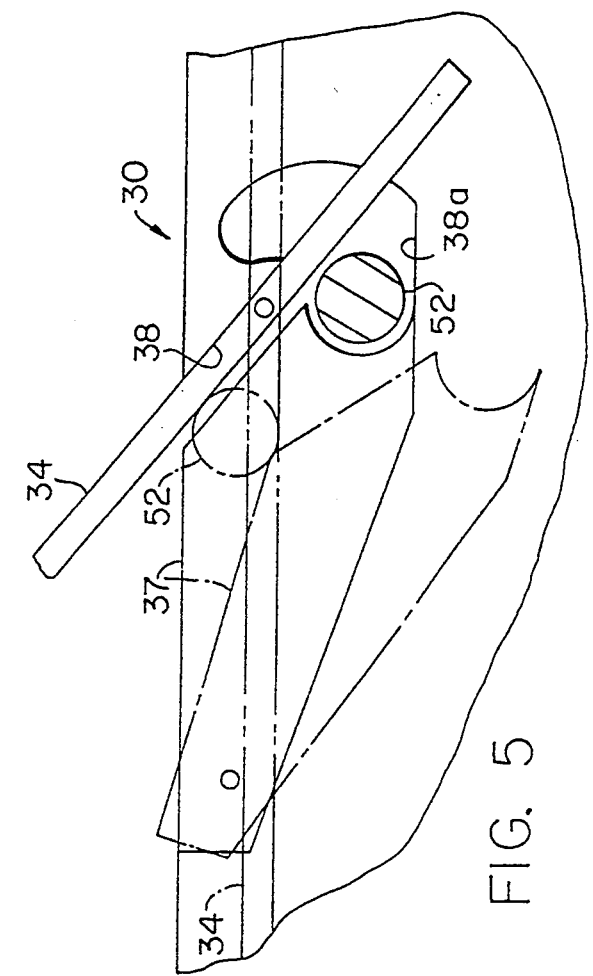

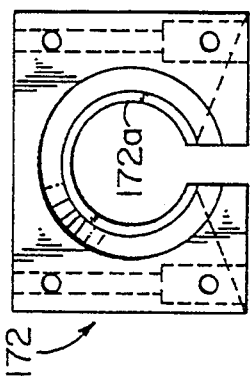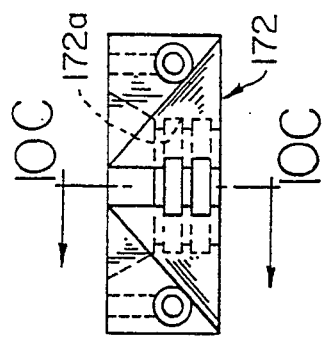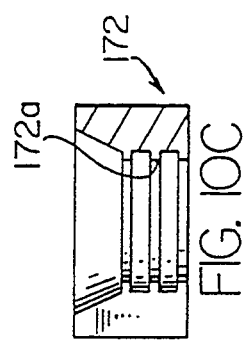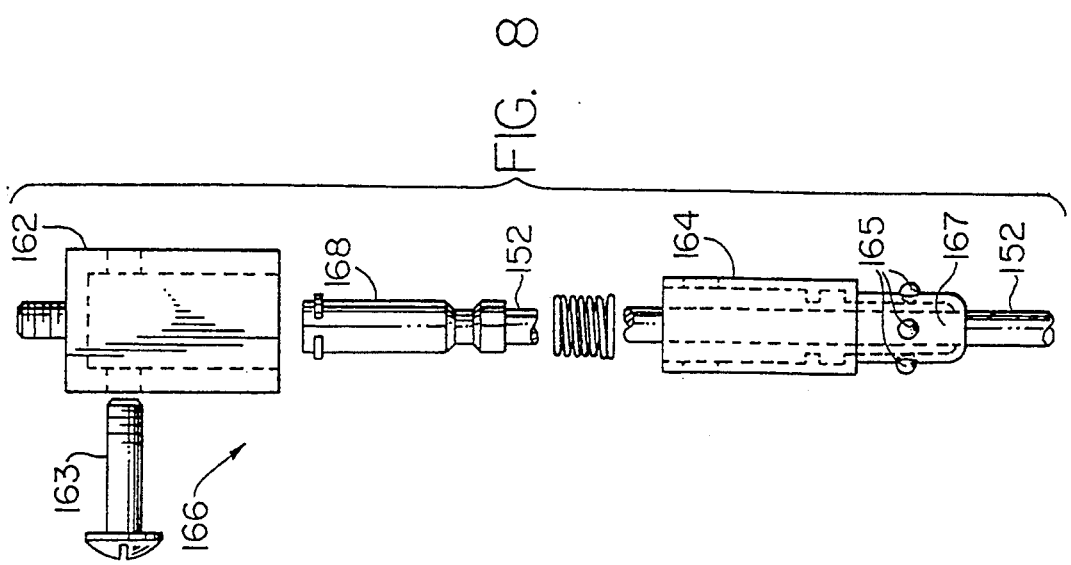

SYSTEM FOR EFFECTING UNDERWATER COUPLING OF OPTICAL FIBER CABLES CHARACTERIZED BY A NOVEL POD-TO-VEHICLE INTERLOCK

STATEMENT OF GOVERNMENT INTEREST

The invention described herein may be manufactured and used by or for the Government of the United States of America for governmental purposes without the payment of any royalties thereon or therefore.

CROSS REFERENCE TO RELATED PATENT APPLICATIONS

The instant application is related to two co-pending U.S. patent applications entitled SYSTEM FOR EFFECTING UNDERWATER COUPLING OF OPTICAL FIBER CABLES CHARACTERIZED BY A NOVEL LATERAL ARM CABLE CAPTURE MECHANISM Ser. No. 08/120,203, pending filed 13 Sep. 1993; and SYSTEM FOR EFFECTING UNDERWATER COUPLING OF OPTICAL FIBER CABLES CHARACTERIZED BY A NOVEL V-PROBE CABLE CAPTURE MECHANISM Ser. No. 08/120,878, pending filed 13 Sep. 1993 having the same filing date.

BACKGROUND OF THE INVENTION (1) Field of the Invention

The present invention relates to an underwater system for coupling fiber optic cables and deals more specifically with a system that uses an autonomous undersea vehicle having a first cable connected to it and a floating pod having a second cable or coupling these cables to provide a communications link between the undersea vehicle and the pod.

(2) Description of the Prior Art

Capturing devices for retrieving cables commonly include hinged or pivoted legs that can be collapsed to a stowed configuration or deployed to an active position during use underwater. See for example U.S. Pat. No. 2,586,003 issued to Caslor.

Underwater missile torpedoes have also been built with retractable fins such as shown for example in U.S. Pat. No. 2,847,960. Such fins permit the torpedo to be fitted into a torpedo tube but provide for the fins to assume a larger diameter than that of the torpedo tube once the torpedo has been launched.

Tug boats commonly provide for devices to handle the relatively heavy cables used in manipulating barges on the surface of the sea. U.S. Pat. No. 4,387,659 shows one approach to handling that portion of the cable which is above the surface of the water.

The use of retractable shackles for seagoing vessels or platforms is also well known. See for example U.S. Pat. No. 4,788,927.

The cables used to tow vessels or platforms on the water surface are also known. See for example U.S. Pat. No. 3,380,425.

Mechanical couplings not unlike those used in railway cars have also been used in connecting articulated seagoing vessels. See for example U.S. Pat. No. 3,922,993.

Undersea vessels have also adopted techniques such as utilized in airborne refueling operation of the "probe and drogue" type. See for example U.S. Pat. No. 3,943,875.

U.S. Pat. No. 4,327,784 suggests a system for refueling an aircraft from a seagoing vessel. The '784 patent also deals with a probe and drogue coupling system.

Ship to ship fluid transfer systems are also known in the art. See for example U.S. Pat. No. 4,408,943.

SUMMARY OF THE INVENTION

The general purpose of the present invention is to provide a system for coupling a first fiber optic cable, associated with a submarine and a remotely controlled self-propelled undersea vehicle, with a second fiber optic cable associated with a torpedo or missile.

A further object is to provide a floating pod having a segment of the second fiber optic cable associated with the torpedo or missile such that the cable segment can be intercepted by the undersea vehicle in order to effect coupling with the first fiber optic cables associated with the undersea vessel.

Still another object of the present invention is to provide a nose capture system for the undersea vessel.

Still another object of the present invention is to provide for a positive male/female plug connection between the undersea vehicle and the end of the cable segment associated with the floating pod.

These objects are accomplished with the present invention by providing a first cable between the aft end of the undersea vehicle and a submarine or the like, and providing an undersea vehicle having a fork-shaped cable capture device at its nose, which fork-shaped device also defines a cable receiving slot adjacent the vertex of the fork (or perhaps more precisely the vertex of the void space formed by the fork).

The torpedo or missile has a second fiber optic cable connected to it, and a segment of the this second cable is suspended generally vertically below the surface of the water from a pod. Conventional underwater homing means is provided between the pod and the undersea vehicle, and the undersea vehicle can be conventionally controlled from a remote location to move transversely toward the vertically suspended cable segment so that the slot of the vertex of the fork-shaped device engages the cable segment. The cable is then directed into the slot as a result of further relative motion between the undersea vehicle and the cable segment. The cable segment "threads" through the slot until the undersea vehicle has reached a point directly beneath the pod.

In one form of the present invention the underside of the pod defines a male plug which is adapted to receive a female plug portion defined by the undersea vehicle slot whereby an optically conductive connection can be achieved therebetween. This preferred embodiment also provides for mechanical locking means in the form of spring loaded devices in the male plug that cooperate with one or more annular slots in a female plug to mechanically lock the undersea vehicle to the pod.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 2 is a top plan view of the forward portion of the undersea vehicle embodying a cable capture mechanism different from a capture mechanism in accordance with the present invention (however, the different embodiment being apropos to a total system description), the different embodiment being provided with a pair of symmetrically mounted diametrically opposed arms pivotably mounted to the vehicle of FIG. 2, one such arm shown in its projecting position and the other shown in its stowed position;

FIG. 3 is a side elevational view of the vehicle of FIG. 2 showing one of the arms in its retracted or stowed position;

FIG. 4 is a frontal view of the undersea vehicle with the arms stowed.

FIG. 5 is a more detailed partial top plan view of the vehicle of FIGS. 3 and 4 showing a slot defined by the undersea vehicle at the inner end of the projecting arm;

FIG. 8 is an exploded view illustrating the various components of the male plug portion associated with the underside of the pod;

FIG. 10A is a detail top view of the nose block (underneath the fork shaped probe) illustrated in FIG. 6;

FIG. 10B is a side view of the nose block of FIG. 10A; and

FIG. 10C is a sectional view of the nose block of FIG. 10B taken along section lines 10C—10C, FIG. 10B.

DESCRIPTION OF THE PREFERRED EMBODIMENT

Figure 1:
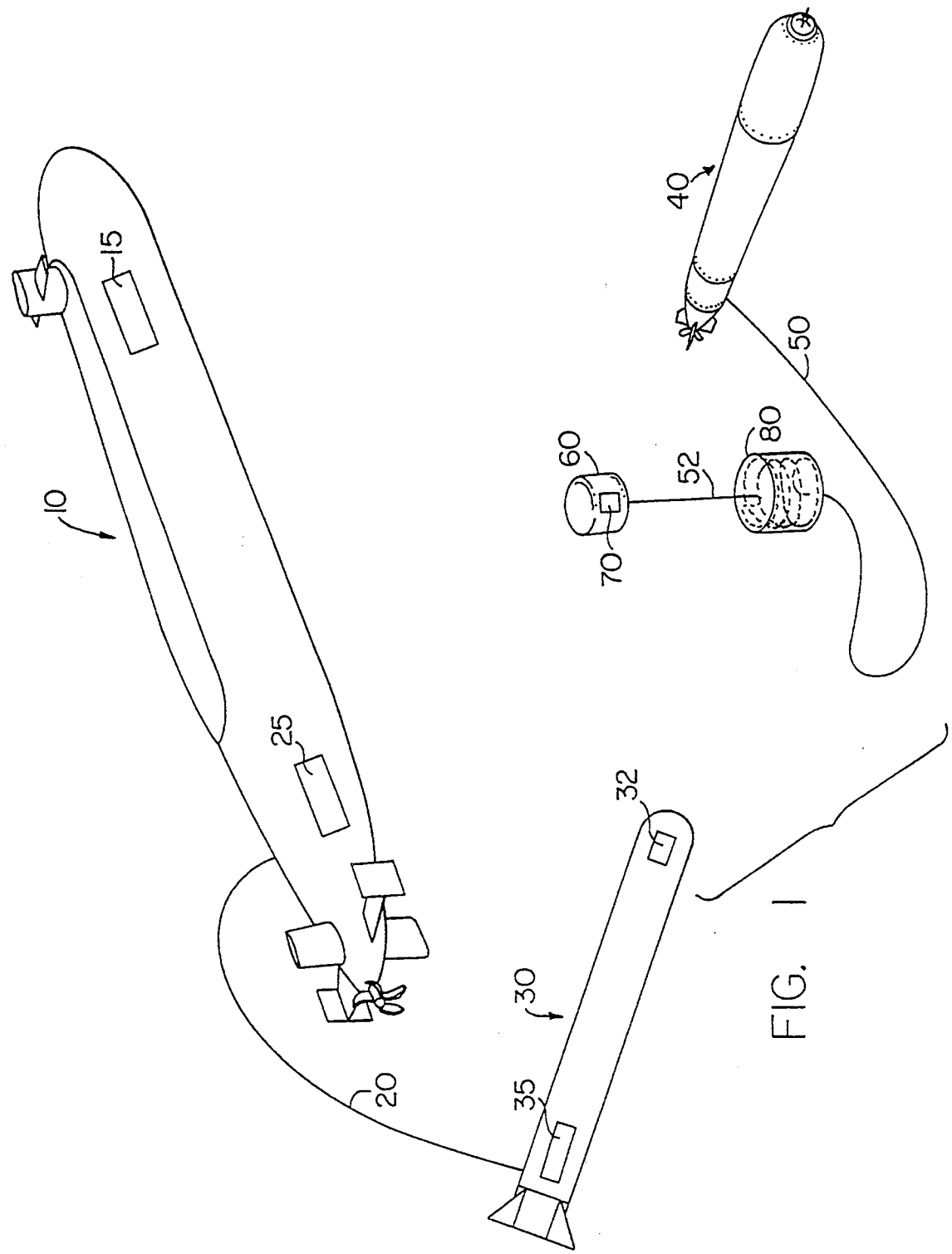
FIG. 1 shows in schematic fashion an arrangement between an undersea vehicle and an optical fiber cable segment suspended from a flotation pod prior to any engagement between the undersea vehicle and the pod or its suspended cable segment.

Referring now to FIG. 1 in greater detail, a submarine 10 has connected to it's aft end a first fiber optic cable 20. An undersea vehicle, or Autonomous Undersea Vehicle, (AUV), 30 has connected at its aft end the opposite end of the first fiber optic cable 20 so that the undersea vehicle can be remotely controlled from the submarine 10. The submarine 10 includes conventional torpedo or missile launching means 15. The vehicle 30 is controllable from the submarine 10 by means 25 aboard the submarine through cable 20 to means 35 on the vehicle 30. A torpedo or underwater missile 40 is provided at one end of a second fiber optic cable 50. This second fiber optic cable 50 passes through a weighted buoy 80 that forms a sea anchor for a generally vertically oriented cable segment 52 of the second cable 50. This cable segment 52 is maintained in a generally vertical orientation in a submerged water column by reason of a positively buoyant pod 60 provided at the end of the second cable 50 opposite the torpedo or missile 40. The "Sea Anchor", or weighted or ballasted buoy 80, has a spool of fiber optic cable that is freely deployed as the weapon "swims" away from it. This allows the pod assembly to maintain its vertical position in the water column. Therefore the vehicle 30 does not have to possess the same speed capability as the weapon 40.

The undersea vehicle 30 and pod 60 are each equipped with any suitable, conventional homing device such as that represented schematically by sonar detector 32 and sonar transmitter 70 respectively. The undersea vehicle 30 is able to terminally home in on the pod 60 as a result of the undersea vehicle 30 being remotely controlled from the submarine 10 for navigation to a position within range of the sonar homing transmitter 70. The first fiber optic cable 20 includes the capability of sending appropriate signals from the detector device 32 in the undersea vehicle 30 back to the submarine.

The weighted buoy 80 provides a generally stationary location in the undersea environment for the cable segment 52 which is being hunted by the undersea vehicle 30. As mentioned previously, cable 50 has a portion of its length that is normally coiled up inside the sea anchor or weighted buoy 80. This not only provides for the different speed capabilities of the weapon 40 and the AUV, but also assures that the generally vertical columnar configuration for the pod 60 and the sea anchor 80 will be assured. This cable payout capability is shown by the broken lines of FIG. 1 inside the sea anchor 80.

Figure 6:
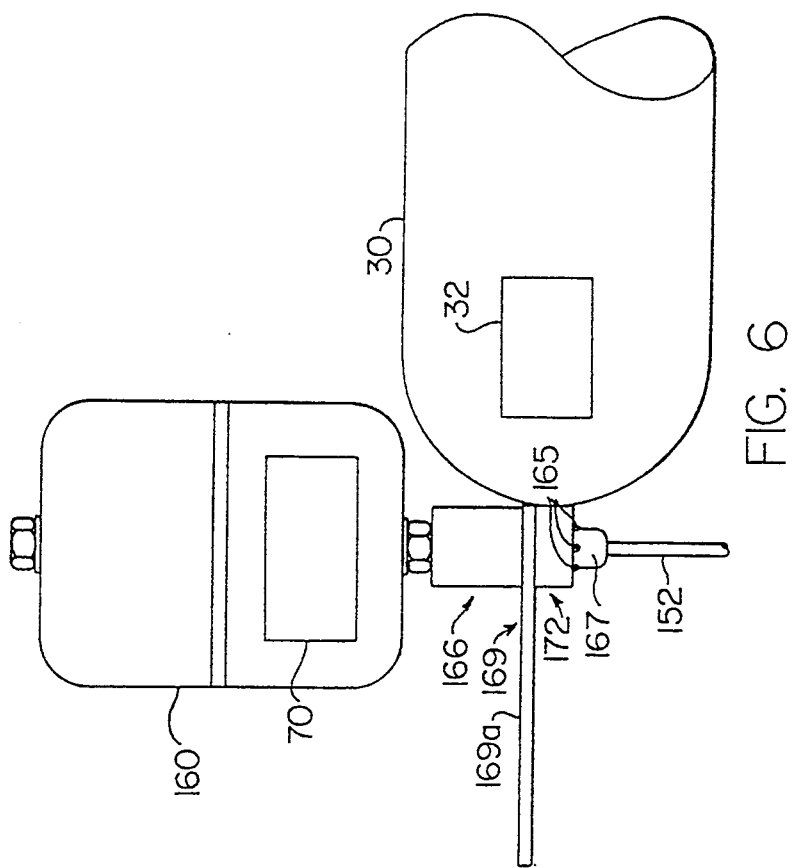
FIG. 6 is a side elevational view embodying an undersea vehicle provided with a cable capturing probe in accordance with the present invention and shown in locking engagement with plug means also in accordance with the present invention defined at the underside of a buoyant pod associated with the suspended fiber optic cable segment of FIG. 1.

The foregoing description of the overall system applies equally to both the embodiment of FIGS. 1–5 and to the embodiment of FIGS. 6–10. The sonar transmitter 70 and sonar receiver 32 are shown in FIGS. 1, 2 and 6. The embodiment of FIGS. 1–5 is the inventor's preferred embodiment, and the embodiment of FIGS. 6–10 is an alternate embodiment.

Referring now to FIG. 2, the undersea vehicle 30 comprises a generally elongated cylindrical configuration with a nose portion that includes a sonar detector 32. This vehicle 30 also includes means 35 responsive to the submarine based means 25 for operating and navigating the self-propelled undersea vehicle 30. The undersea vehicle 30 is fitted with at least one and preferably two projecting arms 34, 34 one of which arms is shown in its stowed position and the other in a projecting position in this view. Actually, both arms are normally operated together, and an internal spring 36 is preferably provided inside the undersea vehicle 30 to urge the arms 34, 34 toward their deployed positions as illustrated by the projecting arm 34.

FIG. 3 shows in a side elevational view the configuration for one of these arms 34. The undersea vehicle 30 defines an radially outwardly open slot 38 adjacent the inner end of each of the pivotably mounted arms 34, which slot 38 is normally closed by a pivoted door 37 as shown in FIG. 5 and is defined in part by the door. Each door 37 is biased such that the vehicle can only move upward along cable 52 toward buoy 60. The inner end of this slot 38 defines a socket 38a or recess for receiving the cable segment 52 referred to previously. The AUV 30 can be navigated remotely via the means 25 and 35 from the submarine through optic signals carried by cable 20 toward a position such that the undersea vehicle homes in on the pod's transmitter 70. As the AUV 30 engages the cable segment 52 the cable segment will move to one or the other side of the nose portion of the undersea vehicle. Still with reference to FIG. 5 one of the arms 34 funnels the cable into the slot 38 and ultimately the cable is received in the socket 38a defined at the inner end of this slot 38. Once the cable has reached a position in the socket defining portion of the slot the pivoted door 37 is held in the position shown for it in FIG. 5 by the cable itself and spring 36. Thus, the slot 38 is closed by the door 37 and the door also holds the cable in the socket defining portion as indicated generally at 52 in FIG. 5. The arm is also biased as shown in FIG. 2 for so holding the cable in the FIG. 5 position. The vehicle motion and force of impact will tend to drive the vehicle up the cable length in the direction aforementioned. In addition, the vehicle has a slightly positive buoyancy and will tend to float upward along the cable after interception. The buoy is slightly negatively buoyant further facilitating the mate.

Because of the door's bias and the vehicle's inertial characteristics and hydrodynamic properties are as outlined above the vehicle and buoy will always be forced to close (become closer) upon one another.

After cable has been so captured, and is provided in the socket at the inner end portion of the slot and the vehicle slides up and engages pod 60, all as described above, direct communication is established between the submarine 10 and the torpedo or missile 40 through the first and second fiber optic cables. Communication is established by suitable means not forming part of this invention, such as complementary pair of optical link terminal transceiver units (not shown) respectively carried by undersea vehicle 30 and pod 60. These units operate on the principle of the coupling of optical or acoustic signals between means on the forward portion of the undersea vehicle and another such means on a general confronting portion of the pod. The coupling of the signal is effected by propagation of the signals through water.

As mentioned previously, FIG. 1 schematically illustrates the general operation of the system for both the embodiment of FIGS. 1–5 and the embodiment of FIGS. 6–10. Both embodiments of the invention relate to the linking or coupling of two fiber optic cables, one of which is associated with a submarine and the other of which is associated with a torpedo or missile. The floating pod in the embodiment of FIGS. 6–10 takes the form shown for it in FIG. 6. This view illustrates the pod 160 as having a male plug portion 166 provided in the lower end or underside of the pod. The plug portion 166 is provided in coaxial relationship with the generally vertically oriented cable segment 152 formed of the second cable that is connected to the aft end of the torpedo or missile. The view of FIG. 6 also illustrates the cable capture mechanism of this embodiment carried by undersea vehicle 30, namely a cable capturing fork 169 bolted atop a nose block 172 which in turn is bolted to the vehicle's hull. The offshoots 169a and 169b of fork 169 each constitute an arm projecting from the undersea vehicle 30.

Figure 7:
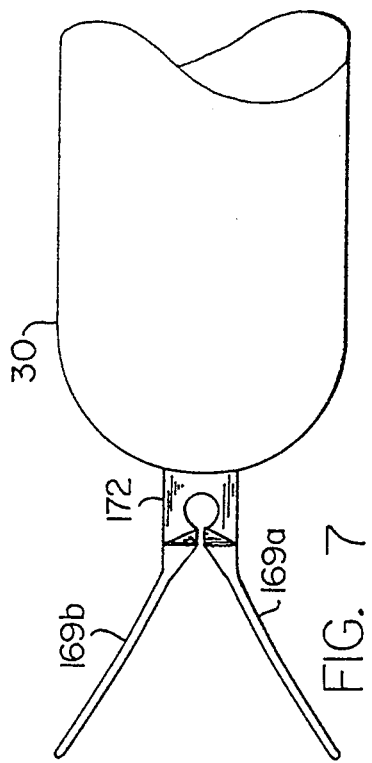
FIG. 7 is a bottom plan view of the undersea vehicle of FIG. 6 illustrating the cable capturing probe mounted in the nose of same.
Figure 9:
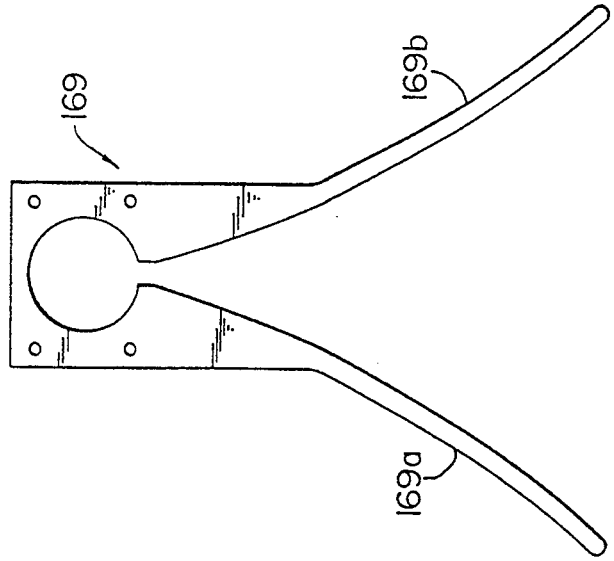
FIG. 9 is a detailed view of the fork shaped probe illustrated in FIG. 7.

This male plug 166 is illustrated in greater detail in the exploded view of FIG. 8. More specifically, this plug 166 comprises a capture pin body or housing 162 which is adapted to receive a lifting pin 164, which has a cylindrical body adapted to be received in the cylindrical bore defined by housing 162. The lifting pin body 164 is secured in the housing 162 by a screw 163. The lifting pin body includes a portion 167 having a plurality of balls 165, which balls are adapted to be urged radially outwardly by a spring biased plunger 168 slidably received inside the lifting pin body 164. The plunger 168 has an annular groove for receiving the balls 165, and the plunger 168 serves to bias these balls 165 radially outwardly for achieving a mechanical lock between the lower portion 167 of the lifting body and a socket defining portion 172a of the nose block means of FIGS. 10A, 10B and 10C. These view 10A, 10B and 10C show the socket portion and FIG. 9 shows the generally V-shaped cable capturing fork or probe 169 which is assembled with the socket portion of FIGS. 10A, 10B and 10C, including arms 169a and 169b which form the "V". Stated another way, the vertex of the fork (or perhaps more precisely the vertex of the void space formed by the fork) defines a cable receiving slot. These portions (capturing fork 169, FIG. 9 and nose block 172, FIGS. 10A, 10B and 10C) form a subassembly that is mounted on the nose portion of the undersea vehicle as shown in FIGS. 6 and 7.

In operation, the AUV moves into the cable 152 and continued forward motion of the AUV, after cable intercept, carries the AUV along the cable toward the pod, and at the same time, causes the cable to be drawn downwardly through the nose block 172 and feeler base portion. In due course, the nose of the AUV reaches the pod where the AUV interlocks with the pod.

In summary, the locking mechanism includes a capture pin body 162 fixed to and depending from the pod. The capture pin body has disposed therein a lifting pin body with a lifting pin extending axially therefrom. The lifting pin body 164 and a commercially available lifting pin (such as a Cart Lane Lifting Pin CL-12-.50) have slidably disposed therein a plunger 168 to which is attached the upper end of the first fiber-optic cable. As the first fiber-optic cable 152 is tensioned under the stress of engagement by the AUV, the cable pulls the plunger 168 downwardly in the pin body 164 to permit the balls 167 disposed in the periphery of the lifting pin to move into an annular groove in the plunger 168. The resulting retraction of the balls permits the pin body to enter the nose block 172. After positive mating is sensed by the vehicle (by any suitable means not forming part of the invention), the AUV powers down resulting in a release of tension in the cable. Upon release of tension in the cable, the balls are forced outwardly by the plunger to engage an undersurface of the nose block.

In light of the above, it is therefore understood that within the scope of the appended claims, the invention may be practiced otherwise than as specifically described.

What is claimed is:

1. An undersea vehicle and cable coupling system comprising:
   a buoyant pod;
   a cable suspended from said pod, a V-shaped cable engaging probe provided on said vehicle such that said cable can be engaged by the open end of said V-shaped probe as a result of moving said vehicle transversely toward said cable;
   plug means including a male plug portion on said pod provided axially around said cable;
   said plug means also including a socket part at the vertex of said V-shaped probe whereby continued transverse movement of said vehicle causes said cable to slide along said V-shaped probe until engaged by said pod male plug portion; and
   said plug portion including a lifting pin mechanism provided in said male plug portion for engaging said socket whereby said probe is secured to said pod and said cable coupled to said vehicle, said lifting pin mechanism having locking devices, and biasing means for urging said locking devices toward positions wherein they engage detents in said socket part.

2. The system according to claim 1 wherein said buoyant pod is provided at an upper end of said cable suspended from said pod, and ballast means provided on a lower end of said cable suspended from said pod, whereby a cable segment defined by said upper and lower ends that is oriented vertically is adapted to be received by said V-shaped probe.

3. The system according to claim 1 further characterized by a control vessel, and a fiber optic cable connecting said undersea vehicle with said control vessel.

4. The system according to claim 3 wherein said undersea vehicle is controllable remotely, said undersea vehicle having means responsive to optical control signals, said control vessel having means for generating optical control signals.

5. The system according to claim 4 wherein said control vessel has means for storing and for launching said undersea vehicle.

6. An undersea vehicle and cable coupling system comprising:
- a buoyant pod;
- a cable suspended from said pod, a V-shaped cable engaging probe provided on said vehicle such that said cable can be engaged by the open end of said V-shaped probe as a result of moving said vehicle transversely toward said cable;
- plug means including a male part on said pod provided axially around said cable;
- said plug means also including a socket part at the vertex of said V-shaped probe whereby continued transverse movement of said vehicle causes said cable to slide along said V-shaped probe until engaged by said pod male plug part; and
- said plug means including a lifting pin mechanism provided in said male plug part for engaging said socket, and means for locking said male plug part in engagement with said socket.

7. The system according to claim 6 wherein said buoyant pod is provided at an upper end of said cable suspended from said pod, and ballast means provided on a lower end of said cable suspended from said pod, whereby a cable segment defined by said upper and lower ends that is oriented vertically is adapted to be received by said V-shaped probe.

8. The system according to claim 6 further characterized by a control vessel, and a fiber optic cable connecting said undersea vehicle with said control vessel.

9. The system according to claim 8 wherein said undersea vehicle is controllable remotely, said undersea vehicle having means responsive to optical control signals, said control vessel having means for generating optical control signals.

10. The system according to claim 9 wherein said control vessel has means for storing and for launching said undersea vehicle.

* * * * *